US011691397B2

(12) United States Patent
Saniei et al.

(10) Patent No.: US 11,691,397 B2
(45) Date of Patent: Jul. 4, 2023

(54) ANISOTROPIC THIN POLYETHYLENE SHEET AND APPLICATIONS THEREOF AND THE PROCESS OF MAKING THE SAME

(71) Applicant: MuCell Extrusion, LLC, Woburn, MA (US)

(72) Inventors: Mehdi Saniei, Belmont, MA (US); James K. Sakorafos, Shrewsbury, MA (US); Nicholas R. Torraco, Arlington, MA (US); Mark E. Lindenfelzer, Milton, MA (US)

(73) Assignee: MuCell Extrusion, LLC, Woburn, MA (US)

( * ) Notice: Subject to any disclaimer, the term of this patent is extended or adjusted under 35 U.S.C. 154(b) by 404 days.

(21) Appl. No.: 16/685,934

(22) Filed: Nov. 15, 2019

(65) Prior Publication Data

US 2020/0198308 A1 Jun. 25, 2020

Related U.S. Application Data

(60) Provisional application No. 62/768,216, filed on Nov. 16, 2018.

(51) Int. Cl.
| | | |
|---|---|---|
| *B32B 27/08* | (2006.01) | |
| *B29C 48/00* | (2019.01) | |
| *B29C 48/18* | (2019.01) | |
| *B32B 27/06* | (2006.01) | |
| *B32B 27/32* | (2006.01) | |
| *B29K 23/00* | (2006.01) | |

(52) U.S. Cl.
CPC ............ *B32B 27/08* (2013.01); *B29C 48/022* (2019.02); *B29C 48/18* (2019.02); *B32B 27/065* (2013.01); *B32B 27/32* (2013.01); *B29K 2023/06* (2013.01); *B29K 2023/18* (2013.01); *B32B 2323/043* (2013.01); *B32B 2323/046* (2013.01)

(58) Field of Classification Search
CPC ... B29C 48/022; B29C 48/18; B29K 2023/06; B29K 2023/18; B32B 2250/02; B32B 2250/05; B32B 2250/24; B32B 2250/242; B32B 2250/246; B32B 2270/00; B32B 2274/00; B32B 2307/308; B32B 2307/518; B32B 2307/538; B32B 2307/54; B32B 2307/582; B32B 2307/5825; B32B 2307/718; B32B 2307/72; B32B 2307/7244; B32B 2307/7246; B32B 2307/732; B32B 2307/736; B32B 2307/75; B32B 2323/043; B32B 2323/046; B32B 2410/00; B32B 2439/06; B32B 2439/46; B32B 2439/70; B32B 2519/00; B32B 27/065; B32B 27/08; B32B 27/18; B32B 27/304; B32B 27/306; B32B 27/32; B32B 27/327; B32B 27/34; B32B 27/36; B32B 27/40; B32B 5/18
See application file for complete search history.

(56) References Cited

U.S. PATENT DOCUMENTS

| | | | |
|---|---|---|---|
| 5,082,608 | A | 1/1992 | Karabedian et al. |
| 5,376,430 | A | 12/1994 | Swenson et al. |
| 5,885,908 | A | 3/1999 | Jaeger et al. |
| 5,916,692 | A | 6/1999 | Brambilla |
| 6,696,166 | B2 | 2/2004 | Bayley et al. |
| 6,958,860 | B2 | 10/2005 | Dontula et al. |
| 7,993,739 | B2 | 8/2011 | Barger et al. |
| 8,512,837 | B2 | 8/2013 | Barreneche |
| 8,658,263 | B2 | 2/2014 | Kawasumi et al. |
| 8,980,964 | B2 | 3/2015 | Topolkaraev et al. |
| 9,126,269 | B2 | 9/2015 | Ohlsson et al. |
| 9,587,093 | B2 | 3/2017 | Aubee et al. |
| 10,011,697 | B2 | 7/2018 | Van der Ven et al. |
| 10,240,014 | B2 | 3/2019 | Schwab |
| 2013/0045347 | A1 | 2/2013 | Kawasumi et al. |
| 2014/0205847 | A1 | 7/2014 | Falla |
| 2014/0274633 | A1 | 9/2014 | Tilton |
| 2016/0059515 | A1* | 3/2016 | Perick ...................... B32B 27/08 428/220 |

FOREIGN PATENT DOCUMENTS

| | | |
|---|---|---|
| EP | 0 877 051 A1 | 11/1998 |
| WO | WO 94/26793 A1 | 11/1994 |
| WO | WO 96/38495 A1 | 12/1996 |

OTHER PUBLICATIONS

Lee, "Coextruding Packaging Films With Foamed Layers", Macro Engineering and Technology, Inc., 2015, http://www.macroeng.com/coextruding-packaging-films-with-foamed-layers.php (Year: 2015).*
Invitation to Pay Additional Fees for International Application No. PCT/US2019/061810 dated Jan. 27, 2020.
International Search Report and Written Opinion for International Application No. PCT/US2019/061810 dated Mar. 25, 2020.

(Continued)

*Primary Examiner* — Frances Tischler
(74) *Attorney, Agent, or Firm* — Wolf, Greenfield & Sacks, P.C.

(57) ABSTRACT

This invention relates to an anisotropic multilayer film and the process of making a multilayer film, wherein a supercritical blowing agent is introduced to at least one layer, wherein at least one layer comprises 10 to 100 percent by weight LLDPE with a melt index of 0.2 to 2 g/10 min. The film in this invention can have a surface with an average Sheffield smoothness, according to TAPPI T 538, of less than 100. The film in this invention can have a puncture propagation tear resistance, in accordance with ASTM D2582, greater than 500 g/mil.

23 Claims, No Drawings

(56) References Cited

OTHER PUBLICATIONS

International Preliminary Report on Patentability (Chapter 1) for International Application No. PCT/US2019/061810 dated May 27, 2021.
Extended European Search Report for EP Application No. 19885446.5 dated Jun. 27, 2022.

* cited by examiner

ANISOTROPIC THIN POLYETHYLENE SHEET AND APPLICATIONS THEREOF AND THE PROCESS OF MAKING THE SAME

RELATED APPLICATIONS

This application claims priority to U.S. provisional patent application No. 62/768,216 filed on Nov. 16, 2018, which is incorporated herein by reference in its entirety.

FIELD

This invention relates to a multilayer film which may be used for packaging application.

BACKGROUND

The present invention relates to an anisotropic polyethylene film comprising at least one layer of polyethylene wherein an inert gas such as carbon dioxide, nitrogen, or a mixture of carbon dioxide and nitrogen is introduced into the polymer melt to enhance processability. The fabrication of monolayer or multilayer films is within the scope of this invention and technique. The films can be used in a wide range of applications such as trash bags, grocery bags, food wrap, sous vide packaging, standup pouches, pet food bags, surface protection, and liquid packaging.

Due to the commercial significance of polymer films, it is imperative to improve the properties of the film products. More specifically, the mechanical property can be improved by various methods such as manipulating the structure of the resin or taking advantage of particular additives. In a blown film process, typically the tear strength in the machine direction (MD) deteriorates due to the alignment of polymer chains.

To improve the mechanical properties and, more specifically, the tear strength of the film, crosslinking is an option; however, it adds to the cost and complexity of the process and results in a non-recyclable product. Traditionally, high melt index (high-MI) linear low-density polyethylene (LLDPE) is blended with low-density polyethylene (LDPE), which is widely used in a blown film line, to improve the tear strength in the machine direction, tensile strength, and elongation at break. On the other hand, high-MI LLDPE shows relatively poor melt strength, which is a crucial factor in stabilizing the blown bubble. For this reason, the use of high-MI LLDPE resin is limited to a small fraction in a blend with LDPE. The use of the fractional melt index LLDPE or low-MI LLDPE in blown film process is not conventionally of interest due to the difficulties in processing and achieving a good surface quality.

The surface quality and smoothness of the thin film, and the blown bubble depends on a few factors including die geometry, molecular weight and molecular weight distribution of the resin, flow rate, and the structure of the polymer. Extrusion instability manifests first as the presence of any nonuniformity on the extrudate's surface or in the cross section along the machine direction, defined as the melt fracture, which results in a film with a poor appearance and surface quality. Sharkskin melt fracture is observed for many linear polymers such as HDPE and LLDPE. Most commercially available branched polymers, including LDPE, however, shows gross melt fracture, which happens at much higher wall shear stress compared to the shear stress at which sharkskin melt fracture starts to happen. The printing quality on the film is determined by a few important parameters based on the printing method, all of which are mutually dependent on the surface smoothness of the film to result in uniform ink coverage on the surface of the film.

U.S. Pat. No. 6,696,166 disclosed a plastic film prepared using a pseudohomogeneous LLDPE resin on a blown film extrusion line. The LLDPE used in this invention must have a base resin density of from 0.915 to 0.919 $g/cm^3$ and a copolymer/homopolymer (COHO) ratio of from 3 to 9. The film must be prepared under specific extrusion conditions using a specific annular extrusion die. The film of this invention has a dart impact strength of greater than 600 grams per mil and a machine direction tear strength of greater than 350 grams per mil.

U.S. Pat. No. 9,587,093 disclosed barrier films were prepared from a blend of two high density polyethylene blend components and a high performance organic crystal nucleating agent. Large reductions in the moisture vapor transmission rate of the film were observed in the presence of the nucleating agent when the melt indices of the two blend components have a ratio of greater than 10/1.

U.S. Pat. No. 9,126,269A disclosed a multilayer blown film comprising a metallocene polyethylene (mPE) having a high melt index ratio (MIR), a layer comprising an mPE having a low MIR, and a layer comprising an HDPE, and/or LDPE.

SUMMARY

This invention relates to an anisotropic multilayer film wherein at least one layer comprises polyethylene.

The film can have a surface with an average Sheffield smoothness, according to TAPPI T 538, of less than 100.

The film can have a puncture propagation tear resistance, in accordance with ASTM D2582, greater than 650 g/mil.

In one aspect, an anisotropic multilayer film is provided wherein at least one layer comprises polyethylene. The film may have a surface with an average Sheffield smoothness of less than 100, according to TAPPI T 538.

In another aspect, an anisotropic multilayer film is provided wherein at least one layer comprises polyethylene. The film may have a puncture propagation tear resistance greater than 500 g/mil, according to ASTM D2582.

In another aspect, a process of making a multilayer film is provided. The process comprises processing a first fluid stream of polymeric material comprising polyethylene in an extruder and; processing a second fluid stream of a second polymeric material in an extruder. The process further comprises co-extruding the first fluid stream and the second fluid stream through an annular die to form a multilayer film comprising a polyethylene layer and a layer comprising the second polymeric material. A supercritical physical blowing agent is introduced into the first fluid stream and/or the second fluid stream in the extruder and the multilayer film may have an average Sheffield smoothness of less than 100 according to TAPPI T 538.

In some embodiments, an inert gas, as a blowing agent, such as nitrogen, or carbon dioxide, or a mixture of carbon dioxide and nitrogen, in the supercritical state, can be introduced at least one layer. The blowing agent can be introduced into the extruder at a very high injection pressure to form a single-phase polymer/gas mixture which improves the processing ability of the polymer.

In some cases, the resin used can be a rich blend of LLDPE with a fractional or very low melt index in the range of 0.2 to 2 gr/10 min as determined in accordance with ASTM D1238, and a density in the range of 0.915 to 0.935 $gr/cm^3$.

The film might be used in a wide range of applications in packaging such as collation shrink, pouches, lamination, pet food bags, surface protection, trash bag, grocery bags, food wrap, pallet wrap, shrink film, labels, and pouches for FFS packaging. The fabrication of a monolayer film is within the scope of this invention.

DETAILED DESCRIPTION

The singular forms "a," "an," and "the" include plural referents unless the context clearly dictates otherwise.

As used in the specification and in the claims, the term "comprising" may include the embodiment "consisting of" and "consisting essentially of."

All ranges disclosed herein are inclusive of the recited endpoint and independently combinable (for example, the range of from 2 grams to 10 grams" is inclusive of the end points, 2 grams and 10 grams, and all the intermediate values)

As used herein, approximating language may be applied to modify any quantitative representation that may vary without resulting in a change in the basic function to which it is related. Accordingly, a value modified by a term or terms, such as "about" and "substantially," may not be limited to the precise value specified. The modifier "about" should also be considered as disclosing the range defined by the absolute value of the two endpoints. For example, the expression "from about 2 to about 4" also discloses the range "from 2 to 4".

The present disclosure relates to multilayer or monolayer polyethylene film suitable to be used in a wide range of applications such as collation shrink, pouches, lamination, pet food bags, surface protection, agricultural films, geomembrane, packaging, trash bag, grocery bags, food wrap, pallet wrap, shrink film, labels, barrier films, lid films, solid food packaging, liquid food packaging, modified atmospheric packaging, stand up pouches, and pouches for FFS packaging. The fabrication of either a monolayer or a multilayer film is within the scope of this invention and technique.

The term "anisotropic" refers to the certain properties of the film differs depending on the direction along which that property is measured. For the purpose of this disclosure, properties were measured against two directions (in-flow or machine direction (MD), and cross-flow or transverse direction (TD)), which are perpendicular to each other.

Generally, the desired application of a thin film determines the essential physical and mechanical properties of the film which subsequently concludes the best resin or a blend of a few resins and additives for processing. Furthermore, the processing properties is a crucial factor in material selection. More specifically, in the blown film process of this invention where the head pressure is high because of a very narrow gap, the melt fracture should be avoided, and the resin should have good thermal stability and high enough melt strength. In extrusion processing, the inclusion of a blowing agent, which results in a different viscosity behavior of a melt during processing might have an effect on the melt fracture of the polymers, hence the improvement of the surface quality of the film.

Processing of either a rich blend or pure LLDPE with a fractional or a very low melt index in a blown film line with a very narrow gap and producing a film with a smooth surface has been very challenging. The rationale behind using such a polymer blend is to take advantage of the good mechanical properties that can be offered by an inexpensive and commercially available LLDPE and mLLDPE, more specifically the grades with a very low melt index, which is of our most interest, and one of the objectives of this invention.

We could benefit from the introduction of inert gas into the polymer melt. The plasticization effects of the dissolved blowing agents, which alters the viscosity of the resin, makes us capable of processing the low melt index resin through a very narrow gap. Operating through a narrow gap results in a high extrusion pressure that can keep the gas dissolved in the polymer until the die exit. The viscosity modification caused by a small amount of dissolved gas, e.g., less than 0.5 wt %, may hinder or delay the occurrence of shark skin melt fracture and results in a very smooth surface.

In some embodiments, the process of making the multilayer film described herein comprising the processing a first fluid stream of polymeric material comprising polyethylene in an extruder; processing a second fluid stream of a second polymeric material in an extruder; and co-extruding the first fluid stream and the second fluid stream through an annular die to form a multilayer film comprising a polyethylene layer and a layer comprising the second polymeric material, wherein a supercritical physical blowing agent is introduced into the first fluid stream and/or the second fluid stream in the extruder; and in some embodiments the process may make a multilayer film comprising more than 2 layers, e.g., three, five, six, seven, eight, or nine layers. In some embodiments, the process of making the multilayer product described herein can make a multilayer film comprising any combination of layers from 3 to 14 layers.

In some embodiments, the process of making the multilayer film described herein comprising the processing of multiple fluid streams, e.g., 2 to 9 streams, of polymeric materials in multiple extruders, e.g., 2 to 9 extruders, and co-extruding the fluid streams through an annular die to form a multilayer film, e.g., 3 to 14 layers, wherein a supercritical blowing agent might be introduced in at least one of the fluid streams inside the extruder.

In some embodiments, various thermoplastics can be used in the blown film process of this invention, or at least in one layer of the product described herein, such as polyethylene (PE), polypropylene (PP), polystyrene (PS), ethylene vinyl acetate (EVA), ethylene vinyl alcohol (EVOH), polyvinyl chloride (PVC), Polyvinylidene chloride (PVDC), polyamide (PA), polyurethane (PU), or any of the resins known as TPE family such as, but not limited to, propylene-ethylene copolymer, Thermoplastic Olefin (TPO), Thermoplastic Polyurethane (TPU). In another embodiment, The LLDPE copolymer used in the product described herein can include an α-olefin co-monomer such as butene, hexane, or octene.

In some embodiments, the multilayer film has at least one layer comprises PE to include any of LDPE, and/or HDPE, and/or LLDPE, and/or mLLDPE, or blend of them, each of which can have a melt index, for example, from 0.1 to 100 g/10 min.

In some embodiments, the product described herein can have at least one layer comprising a thermoplastic polymer with a high oxygen barrier property, e.g., EVOH, and/or relatively low water vapor transmission rate, e.g., HDPE.

The choice of material could be determined in separate ways based on processing requirements, product properties, and material specifications. The processing requirement in a blown film process dictates the use of a high melt strength resin to get a stable bubble. Low-density polyethylene (LDPE) is relatively easy to process resin at a lower processing temperature compared to HDPE. Because of the existence of long chain branching, all LDPE grades show a rather high processing melt strength. Therefore, an entirely stable bubble with a relatively low frost line height can be examined with a PE blend the majority of which is LDPE. Moreover, LDPE shows an elongational thickening behavior, which can further increase the melt strength and can cause strain hardening. On the other hand, generally LDPE presents a rather low tear strength along the machine direction (MD).

Typically, film manufacturers capitalize on a blend of LDPE and high-MI LLDPE, while the blend is an immiscible blend in many cases, wherein LDPE improves the processing ability and ductility while the LLDPE enhances the modulus and strength. In a conventional blown film line, the production of the film from LLDPE is mostly avoided because of the extensive amount of difficulties in processing. The most important of which is forming a stable bubble using a high MI LLDPE that exhibits a poor melt strength. in some embodiments, we are using LLDPE with a very low melt index, or fractional melt index, which can offer an enhanced MD tear strength, improved gas, and moisture permeation properties compared to that of LDPE, far better environmental stress cracking resistance, and an enhanced tensile strength at yield.

In blown film extrusion, typically sharkskin melt fracture occurs when LLDPE is processed through a narrow die gap. Furthermore, LLDPE with a low melt index, which offers improved toughness, shows a higher tendency to melt fracture than a high-MI LLDPE, as do metallocene catalyzed resins (mLLDPE) which have a narrow molecular weight distribution than conventional LLDPEs. In this invention, a very small and precise amount of supercritical gas, as a processing aid and blowing agent, is injected into the molten polymer at a high pressure, for example greater than 34 bar, in some embodiments greater than 70 bar, in some embodiments greater than 240 bar, and in some other embodiments greater than 380 bar inside an efficient and effectual mixer, e.g., cavity transfer mixer, as an extension to the extruder's barrel. For example, the supercritical blowing agent used in this invention can be either nitrogen, carbon dioxide or a mixture of nitrogen and carbon dioxide. The temperature of the mixer could be accurately controlled within ±1° C. The inclusion of a very small amount of gas could offer a few important advantages in blown film extrusion. First, it could reduce the back pressure which allowed processing at a higher throughput and delayed any bubble instability. Therefore, melt fracture could be reduced significantly. Second, the possibility of using a very low melt index LLDPE with narrow molecular weight distribution, to include metallocene α-olefin copolymers, became viable for processing to improve the film properties.

In some embodiments, the LLDPE component of the resin has a melt index in the range 0.1 to 1.2 g/10 min, and in some other embodiments, the melt index is greater than 1.2 g/10 min as is determined by ASTM D1238. In some embodiments, the LLDPE component of the resin can have a density of 0.915 to 0.935 g/cm$^3$. In some cases, the polyethylene resin may be comprised of 70 to 90 percent by weight copolymer and from 30 to 10 percent by weight homopolymer, corresponding to 100 percent by weight. In some embodiments, the LLDPE component of the resin may be a copolymer containing one or more of the α-olefins; 1-butene, 1-hexene, 4-methyl-1-pentene, and 1-octene. In another case, the polyethylene resin can be a blend of 51 to 99 percent by weight LLDPE with a very low MI in the range of 0.2 to 1 g/10 min, as determined by ASTM D1238, and 1 to 49 percent by weight LDPE. In some cases, the polyethylene blend may contain up to 10 percent by weight HDPE that might improve the miscibility of the blend. Also, for example, the LLDPE component of the resin may be a blend of mLLDPE and LLDPE. In another embodiment, the multilayer film described herein has at least one layer comprising about 10 to 100 percent by weight LLDPE with a melt index of 0.2 to 2 g/10 min.

In some embodiments, the multilayer film described herein can have at least one layer comprising a thermoplastic resin, e.g., PE, PP, PA, PET, EVOH with a low melt index, e.g., less than 5, in some embodiments less than 2, and in some embodiments less than 1. In another embodiment, at least one layer of the multilayer film comprises ionomer, or Maleic anhydride.

In some cases, at least one layer of the film has 0.05 to 15 percent by weight of an inorganic additive, an organic additive or a mixture of an inorganic and an organic additive. In some other cases, the polymer composition of each layer may comprise some apt amounts of other additives to include pigments, antistatic agents, UV stabilizers, and antioxidants. In another embodiment, at least one layer includes a clarifying agent at less than 1 percent by weight, in some embodiments less than 0.5 percent by weight, in some embodiments less than 0.1 percent by weight, and in some embodiments less than 0.05 percent by weight.

In some embodiments, the product described herein has a thickness of about 0.4 to 100 mils. In some cases, the multilayer film has a mass per unit area (gr/m$^2$) of about 5 to 950.

In some embodiments, a multilayer film fabricated using this invention in a blown film process has sets of significantly improved physiomechanical properties compared to the film articles of the prior art, to the best of applicant's knowledge, as in particular puncture propagation tear (PPT) resistance, acc. to ASTM D2582, can be greater than 650 g/mil, in some embodiments can be greater than 950 g/mil, and in some embodiments can be greater than 1200 g/mil.

In some embodiments, the product described herein has an average sheffield smoothness, according to TAPPI T 538, of less than 100, in some embodiment less than 70, in some other embodiments, less than 50, in some embodiments less than 30, and in some embodiments less than 10.

All the equipment used in this invention is very well-known to the skilled persons in the art and well labeled and extensively described in the literature. In some cases, the film can be produced by the blown film process using an annular die with a die gap from 0.45 to 1.3 mm and a blow-up ratio ranging from 2:1 to 3.5:1. Higher blow-up ratios can result in a more balanced MD/TD orientation which improved overall film toughness. In some cases, the die geometry and specification may be manufactured according to the patent with the application number of US 2012/0228793 A1.

As it was explained earlier, a very small amount of a physical blowing agent in a super critical condition can be injected into the molten resin, at a very precisely controlled rate, e.g., less than 0.5%, inside a mixer with a very effectual distributive and dispersive element before entering the annular die. This unit is controlled as a separate temperature zone with an accuracy of ±1° C. and a gas injection pressure variation below 1%. The plasticization effect of the gas results in a viscosity change of the molten resin, e.g., the aforementioned low-MI PE resin, which can enhance the processibility of the resin at a lower temperature compared to the processing temperature which is used conventionally.

This also may benefit and assist ones in manipulating the crystallization kinetics of the resin to improve a few properties.

In some embodiments, because of the overall high specific heat capacity of polyethylene, the transverse stretch of the bubble could be delayed until the film became cooler, which enhanced the bubble stability and the frost line height. This caused the bubble expansion in the transverse direction to occur at a lower temperature and shorter period of time which is very effective in increasing the molecular orientation in the transverse direction, therefore, to improve the MD tear strength.

In some other embodiments, the multilayer film described herein can be produced by the blown film process, cast film process, or any method known in the art.

In some embodiments, the multilayer film can be made using a conventional double bubble or a triple bubble blown film line. In some embodiment, the multilayer film can be stretched biaxially using any known method in the art.

In some cases, the multilayer film comprises more than one solid (i.e., non-foam) layers. For example, the polyethylene layer may be a solid layer. In some cases, all of the layers of the multi-layer film are solid layers.

In one case, the multilayer film comprises at least one foam layer with an expansion ratio of less than 1.2.

The invention claimed is:

1. A process of making a multilayer film comprising:
processing a first fluid stream of polymeric material comprising polyethylene in an extruder; processing a second fluid stream of a second polymeric material in an extruder;
and co-extruding the first fluid stream and the second fluid stream through an annular die to form a multilayer film comprising a solid polyethylene layer and a layer comprising the second polymeric material,
wherein a supercritical physical blowing agent is introduced into the first fluid stream comprising polyethylene in the extruder and the multilayer film has an average Sheffield smoothness of less than 100 according to TAPPI T 538.

2. The process of claim 1, wherein the multilayer film is blown in a blown film process.

3. The process of claim 2, wherein the blown film process uses a blow-up ratio of 2:1 to 3.5:1.

4. The process of claim 1, wherein the annular die has a die gap of between 0.45 to 1.3 mm.

5. The process of claim 1, wherein the supercritical physical blowing agent is introduced into the first fluid stream inside a mixing section of the extruder at an injection pressure greater than 34 bar.

6. The process of claim 1, wherein the supercritical blowing agent used is either nitrogen, carbon dioxide or a mixture of nitrogen and carbon dioxide.

7. The process of claim 1, wherein the multilayer film has a puncture propagation tear resistance greater than 500 g/mil, according to ASTM D2582.

8. The process of claim 1, wherein a supercritical physical blowing agent is introduced into the second fluid stream of the second polymeric material.

9. The process of claim 1, wherein at least one layer contains 0.05 to 15 percent by weight of an inorganic additive, an organic additive or a mixture of an inorganic and an organic additive.

10. The process of claim 1, wherein at least one layer contains at least one of pigments, antistatic agents, UV stabilizers, and antioxidants.

11. The process of claim 1, wherein the layer comprising the second polymeric material is a foam layer.

12. The process of claim 11, wherein the foam layer has an expansion ratio of less than 1.2.

13. The process of claim 1, wherein the multilayer film has an average Sheffield smoothness of less than 10, according to TAPPI T 538.

14. The process of claim 1, wherein the multilayer film has a puncture propagation tear resistance greater than 950 g/mil, according to ASTM D2582.

15. The process of claim 1, wherein the solid polyethylene layer comprises any of LDPE, and/or HDPE, and/or LLDPE, and/or mLLDPE, or blends thereof.

16. The process of claim 15, wherein the LLDPE or mLLDPE is a copolymer of ethylene and one or more alpha-olefins: 1-butene, 1-hexene, 4-methyl-1-pentene, and 1-octene.

17. The process of claim 1, wherein the solid polyethylene layer comprises LLDPE.

18. The process of claim 17, wherein the LLDPE has a solid density of 0.915 to 0.935 g/cm$^3$.

19. The process of claim 17, wherein the LLDPE has a melt index of 0.5 to 1 g/10 min.

20. The process of claim 17, wherein the solid polyethylene layer comprises 10 to 100 percent by weight LLDPE with a melt index of 0.2 to 2 g/10 min.

21. The process of claim 1, wherein the solid polyethylene layer comprises 100 percent by weight LLDPE.

22. The process of claim 1, wherein the thickness of the multilayer film is 0.4 to 100 mils.

23. The process of claim 1, wherein the multilayer film has a mass per unit area of 5 to 950 (gr/m$^2$).

* * * * *